Figure 1:
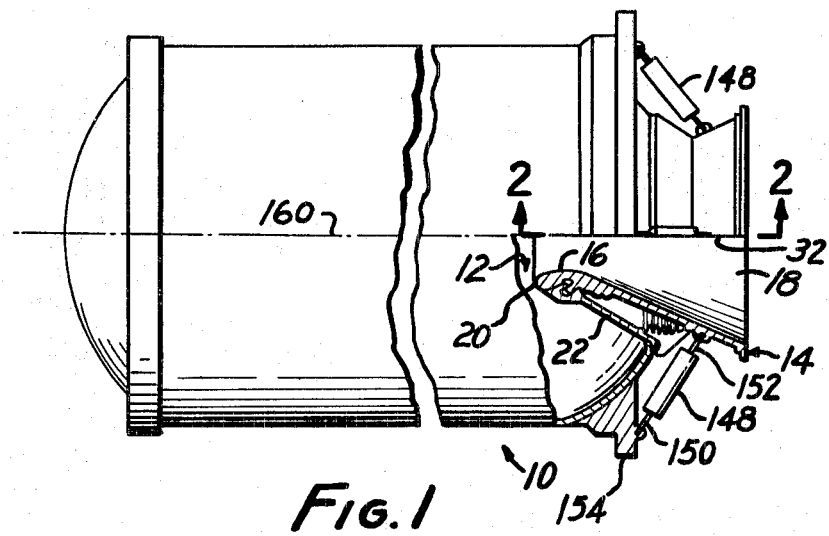

United States Patent

[11] 3,570,768

[72] Inventors Carle C. Conway
 La Habra, Calif.;
 Kurt Barth, Farmington, Conn.; David R. Collis, Shingle Springs; Kjell Steinmo, Fair Oaks, Calif.
[21] Appl. No. 751,202
[22] Filed Aug. 8, 1968
[45] Patented Mar. 16, 1971
[73] Assignee Aerojet-General Corporation
 El Monte, Calif.

[54] OMNIVECTOR NOZZLE
 12 Claims, 3 Drawing Figs.
[52] U.S. Cl. ................................................. 239/265.35
[51] Int. Cl. ............................................... B64c 15/04
[50] Field of Search .......................................239/265.11, 265.47

[56] References Cited
UNITED STATES PATENTS

| | | | |
|---|---|---|---|
| 3,451,625 | 6/1969 | Fruktan........................ | 239/265.35 |
| 3,106,061 | 10/1963 | Eder............................. | 238/265.35 |
| 3,140,584 | 7/1964 | Ritchey et al................. | 239/265.35 |
| 3,179,447 | 4/1965 | Parr et al. ................... | 239/265.35 |
| 3,182,452 | 5/1965 | Eldred........................ | 239/265.35 |

Primary Examiner—Lloyd L. King
Attorneys—Edward O. Ansell and D. Gordon Angus

ABSTRACT: A nozzle according to the present disclosure comprises a movable section having a substantially semispherical ball surface, and a fixed section having a substantially semispherical socket surface. A gas seal is provided between the ball and socket surfaces. A load bearing surface, independent of the ball and socket surfaces, is provided for supporting loads between the fixed and movable sections of the nozzle.

According to an optional and desirable feature of the present disclosure, the ejection load on the movable section is minimized.

INVENTORS;
CARLE C. CONWAY,
KURT BARTH,
DAVID R. COLLIS,
KJELL STEINMO.
BY D. Gordon Angus
ATTORNEY.

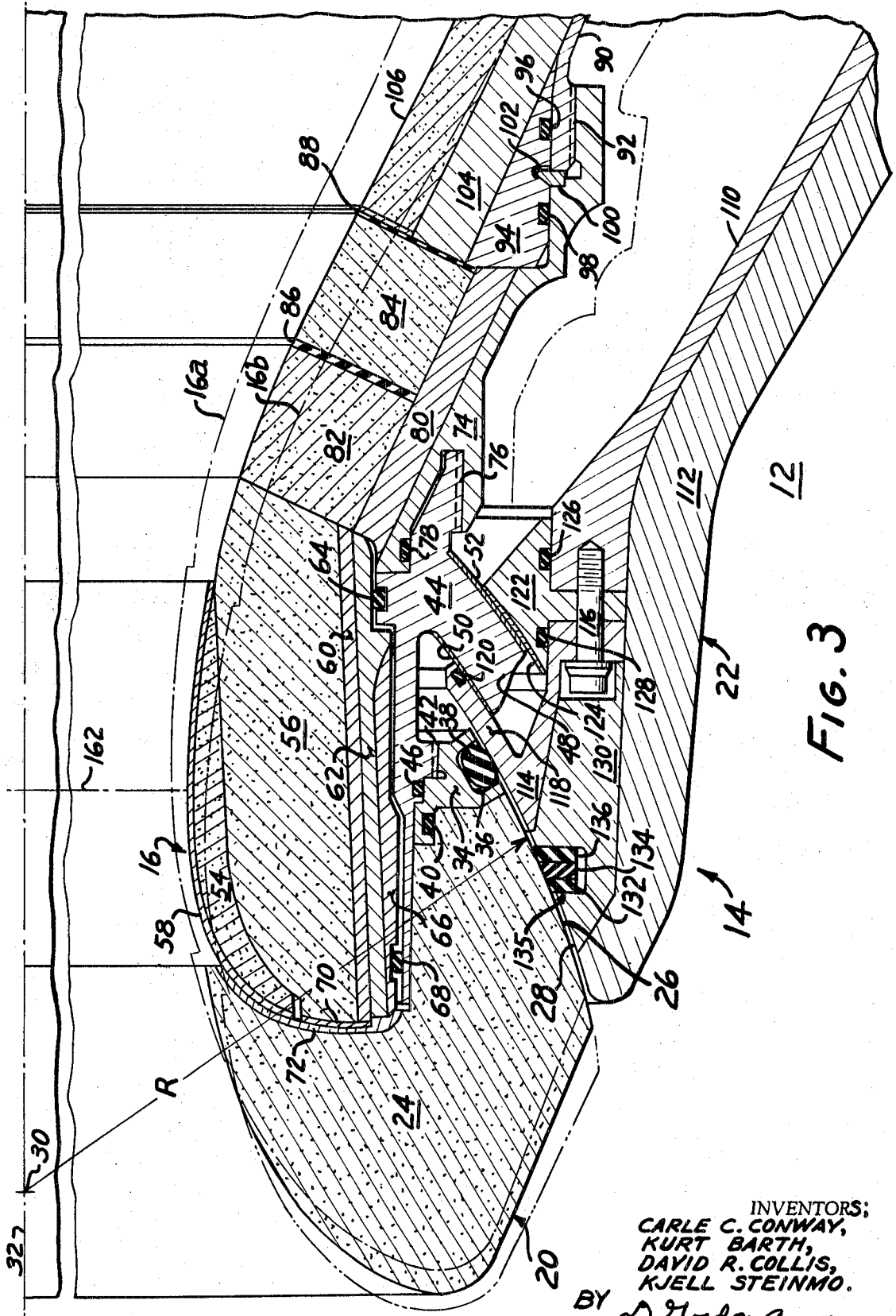

OMNIVECTOR NOZZLE

This invention relates to adjustable nozzles for rocket motors, and particularly to omnivector nozzles capable of producing thrust in selectively variable pitch and yaw directions.

It is an object of the present invention to provide an omnivector nozzle capable of providing selectively adjustable yaw and pitch thrust deflections.

Another object of the present invention is to provide an omnivector nozzle having bearing surfaces between fixed and movable sections of the nozzle so as to prevent significant axial movement of the movable section of the nozzle with respect to the fixed section of the nozzle.

Another object of the present invention is to provide an omnivector nozzle having fixed and movable sections and having first bearing surfaces between the fixed and movable sections to support loads, and second sealing surfaces between the fixed and movable sections to provide a gas seal between the sections.

Another object of the present invention is to provide an omnivector nozzle having movable and fixed sections and a main gas seal located between the movable and fixed sections and close to the throat so that ejection loads on the nozzle may be minimized and so that the supporting structure necessary for positioning the movable section may be minimized.

An omnivector nozzle according to the present invention comprises a movable section having a substantially semispherical ball surface, and a fixed section having a substantially semispherical socket surface. The ball and socket surfaces are provided with a gas seal to prevent leakage of gas from the combustion chamber of the rocket; and semispherical bearing surfaces independent of the ball and socket surfaces are provided for supporting the loads of the nozzle. All semispherical surfaces are generated about the same center point. The term "semispherical"as used herein means a fragment or segment of a true sphere.

According to an optional and desirable feature of the present invention, ejection forces on the nozzle are minimized; and structure supporting the position of the movable section of the nozzle can be minimized. The ejection forces can be reduced to zero or even to negative values so that bearing friction between the sections of the nozzle can be reduced to zero and torque requirements on the nozzle may be minimized.

According to an optional and desirable feature of the present invention, secondary seals are provided between all other bearing surfaces.

Figure 2:
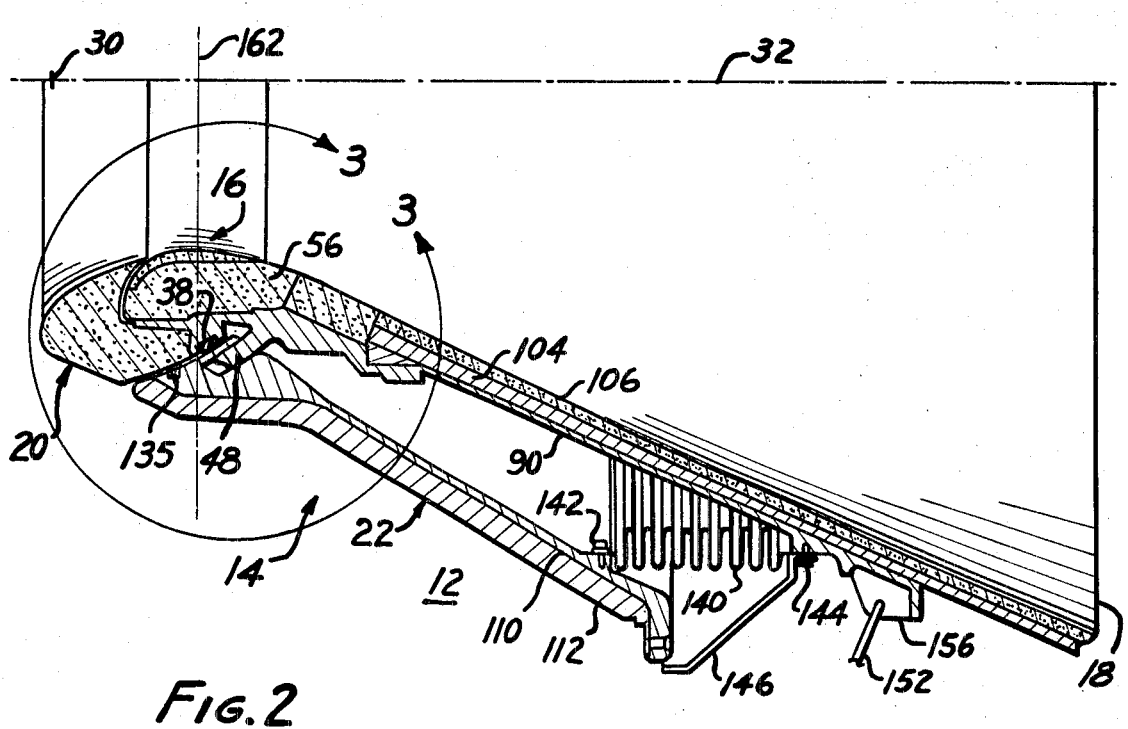

The above and other features of the present invention will be more fully understood from the following detailed description and the accompanying drawings, in which:

FIG. 1 is a side view elevation, partly in cutaway cross section, of a rocket motor having an omnivector nozzle according to the presently preferred embodiment of the present invention;

FIG. 2 is a side view elevation in cutaway cross section of the nozzle illustrated in FIG. 1, taken at line 2–2 in FIG. 1; and FIG. 3 is an enlarged section view of the throat portion of the nozzle illustrated in FIGS. 1 and 2, encompassed within line 3–3 in FIG. 2.

Referring to the drawings, and particularly to FIG. 1, there is illustrated a rocket 10 having a thrust chamber 12 and a nozzle 14. Nozzle 14 includes a throat 16 through which combustion gases from thrust chamber 12 are emitted, and an exit opening 18 through which the exhaust gases are exhausted. As illustrated in the drawings, nozzle 14 comprises movable section 20 and fixed section 22.

As illustrated in FIGS. 2 and 3, and particularly in FIG. 3, movable section 20 includes entrance cap 24 having a substantially semispherical surface 26 proximate to semispherical surface 28 of fixed section 22. Surfaces 26 and 28 are spaced apart by a small increment, for example, a few thousandths of an inch, and each have their centers of revolution at point 30 on axis 32 of the motor. Both surfaces 26 and 28 have a radius approximated by radius R. Entrance cap 24, which may, by way of example, be constructed of a suitable molded graphite and phenolic plastic, is fixed to housing 34 which may, by way of example, be constructed of 4340 steel. Annular recess 36 is provided in housing 34 to support annular seal 38. Seal 38 forms the main gas seal of the nozzle and seals against bearing surface 28 of the fixed section 22 of the nozzle. Seal 38 is preferably constructed of viton rubber and is preferably packed in recess 36 with silicon grease. If desired, secondary seal 40 may be provided between entrance cap 24 and housing 34. Alternatively, seal 38 may be eliminated and seal 40 may be used as the primary or main seal, but in any event, surfaces 26 and 28 provide a fluid seal for the nozzle. Housing 34 is threadably mounted at threaded portions 42 to bearing ring 44, and a secondary seal 46 may be provided to seal between housing 34 and bearing ring 44. Preferably, bearing ring 44 is bonded to entrance cap 24.

Bearing ring 44, which may be constructed of suitable 4340 steel, includes substantially conical tongue 48 having semispherical surfaces 50 and 52. Surfaces 50 and 52 are preferably chrome plated for purposes hereinafter explained.

Throat 16 is formed by throat cap 54 formed over throat ring 56 and covered by ring 58. By way of example, throat cap 54 and throat ring 56 may be constructed of molded graphite, and protective ring 58 may be constructed of zirconium oxide. Rings 60 and 62, which may be constructed of zirconium oxide and molybdenum, respectively, are positioned below throat ring 56 in successive relation, ring 62 being sealed to bearing ring 44 by means of secondary seal 64. Pad 66, which may be constructed of asbestos felt, is positioned between bearing ring 44 and ring 62 so that a small gap is permitted therebetween, which gap is sealed by means of secondary seal 68. Ring 70, which may be constructed of forged zirconium oxide, is positioned over the forward edge of throat ring 66, and a suitable resilient potting compound 72 is sandwiched between rings 58 and 70 and entrance cap 24.

The movable section of the nozzle further includes an assembly ring 74 threadably mounted by threads 76 to bearing ring 44. Ring 74 is sealed by secondary seal 78 to bearing ring 44. Ring 80 is mounted over assembly ring 74 and supports frustroconical plugs 82 and 84. Ring 80 may be constructed of a suitable formed plastic and plugs 82 and 84 may be constructed of graphite. Suitable silicon rubber potting compound 86 is preferably sandwiched between plugs 82 and 84 and the plugs, together with the potting compound, form a portion of the surface of the nozzle. Ring 88 which may, for example, be constructed of suitable zirconium oxide, is positioned against an end of plug 84.

Support ring 90 is threadably assembled to assembly ring 74 at threaded portion 92, and supports ring 94 which in turn is sealed by secondary seals 96 and 98 to support ring 90 and assembly ring 74, respectively. Retainer ring 100 is sandwiched between assembly ring 84 and support ring 90 and is received in annular groove 102 in ring 94. By way of example, support ring 90 may be constructed of suitable titanium and ring 94 is preferably constructed of reinforced ablative plastic. Rings 90 and 94 together support ring 104 which in turn supports ring 106 which forms a substantial portion of the surface of the nozzle. Ring 104 is preferably constructed of wrapped silica phenolic tape, and ring 106 is preferably constructed of graphite phenolic tape.

The fixed portion of the nozzle comprises housing 110 which may by way of example be constructed of a forged titanium alloy, insulated by an insulation material 112, which may be a suitable rubber compound. The inner surface of insulation material 112 provides the inner surface of thrust chamber 12. Housing 114 is fastened to housing 110 by means of suitable fasteners such as threaded fastener 116, and forms arm 118. Seal 38, supported by housing 34, is adapted to seal against surface 26 of housing 114. Secondary seal 120 seals housing 114 against surface 50 of tongue 48.

Sandwiched between housing 110 and 114 and fastened thereto by means of threaded fastener 116, is bearing ring 122 having bearing surface 124 adapted to bear against surface 52 of tongue 48. Arm 118 and surface 124 together form a recess in the fixed section of the nozzle adapted to engage tongue 48 of the movable section. Secondary seals 126 and 128 seal bearing ring 122 to housing 110 and 114, respectively. Housing 114 and bearing ring 122 are preferably constructed of 4340 steel, and bearing surface 124 is preferably plated with a molydisulfide plating over the 4340 steel forming bearing ring 122. As will be more fully understood hereinafter, the junction between surfaces 124 and 52 provides the main load bearing surface between the movable and fixed sections of the nozzle.

Surface 28 of the fixed portion of the nozzle is completed by means of support ring 130 mounted to housing 114, and rings 132, 134 and 136 mounted to ring 130 which together form scraping ring 135 for preventing dirt, grit and other foreign material from entering the interface between surfaces 26 and 28 and from main seal 38. Support ring 130 is preferably constructed of a suitable molded silica phenolic plastic, and rings 132, 134 and 136 are preferably constructed of a suitable molding compound, such as a molded plastic.

Referring particularly to FIG. 2, there is illustrated a flexible bellows 140 mounted to housing 110 and support ring 90 by means of fasteners 142 and 144, respectively. Guard ring 146 may be mounted to support ring 90 to protect the bellows from impact by foreign particles.

Actuator 148 is connected by linkage 150 to housing 154 of rocket motor 10 and by linkage 152 to bracket 156 which is integral with support ring 90 of the movable section of the nozzle. As illustrated particularly in FIG. 1, there are four actuators 148, but it is to be understood that any number of actuators may be used.

The nozzle illustrated in the drawings is assembled by positioning bearing rings 122 and 44 and housing 114 in place and fastening ring 122 and housing 114 to housing 110 by means of threaded fastener 116. Seal 38 is assembled to housing 34 which in turn is threaded to ring 44. Bearing ring 130 may then be bonded to housing 114 and insulation 112 is bonded over housing 110 and ring 130. Assembly ring 74 is threadably fastened to bearing ring 44 and ring 80 together with plugs 82 and 84 and layers 86 and 88 are assembled over ring 74. Ring 94 is then positioned against ring 80 over assembly ring 74 and retaining ring 100 is positioned within groove 102 of ring 94. Support ring 90 is threadably assembled to assembly ring 74 and layers 104 and 106 are wrapped over the support ring 90 to form the nozzle surface. The throat assembly comprising pad 66, rings 62 and 60, throat ring 56, throat cap 54 and ring 58, is assembled over bearing ring 44. Bellows 140 is then assembled to support ring 90 by means of threaded fastener 144 and guard ring 146 is positioned over the bellows to protect it from impact of foreign material. Scraper ring 135 is then assembled to ring 130 and entrance cap 24 is bonded into position. Actuators 148 are then connected to the support plate 90 and to suitable control devices such as servomechanisms.

In operation of the nozzle according to the present invention, actuators 148 are operated to selectively position the movable section of the nozzle with respect to the fixed section, for example to the positions illustrated by dashed lines 16a and 16b in FIG. 3. The actuators selectively position the movable section of the nozzle so that the movable section swivels about point 30. Seal 38 provides a fluid seal between the movable and fixed sections of the nozzle to thereby prevent escape of exhaust gases from between the two sections. Scraper ring 135 prevents foreign particles such as dirt or grit from entering the region of seal 38, thereby preventing damage to the seal.

Surfaces 52 and 124 between the movable and fixed sections of the nozzle provide the main load-bearing surface between the two sections. Since the load-bearing surfaces between the fixed and movable sections of the nozzle do not include the main gas seal, the main seal supports little or no load. Thus, a nozzle according to the present invention may be moved so that the angle between axis 32 of the nozzle and axis 160 of the rocket engine may be selectively positioned.

One important feature of the present invention resides in the positioning of the main gas seal 38 close to the throat of the nozzle. Plane 162, shown in section in FIGS. 2 and 3, is a plane substantially perpendicular to axis 32 of the nozzle and is defined by the smallest cross section of the throat. As illustrated in the drawings, seal 38 is positioned aft of plane 162.

It can be shown that the ejection load on the movable section of the nozzle is equal to the product of the pressure within the combustion chamber and the area encompassed by the gas seal between the fixed and movable sections of the nozzle, minus the force of the back pressure on the exit cone. Thus, $$L_e = P_c \cdot A_s - F_b \quad (1)$$

where $L_e$ is the ejection load on the movable section of the nozzle, $P_c$ is the pressure within the combustion chamber, $A_s$ is the area encompassed by seal 38 minus the throat area, and $F_b$ is the force of the back pressure on the nozzle cone. It can further be shown that the force of the back pressure is a function of the combustion chamber pressure, the throat diameter, and the area encompassed by the exit opening of the nozzle.

From equation (1) above, it can be seen that for a given rocket and nozzle assembly of fixed design, diameters of the throat and exit opening and the combustion chamber are fixed. To lessen the ejection load on the movable section of the nozzle, consideration may be given to the area encompassed by seal 38 ($A_s$).

Since the area encompassed by the seal is proportional to the outer diameter of the seal, a main seal of smallest outer diameter would provide the best results. Of course, the seal must be spaced far enough from the surface of the nozzle so as not to be deteriorated by the hot exhaust gases passing through the nozzle. However, by locating the seal as far aft as possible along the bearing surface 26, the diameter of the seal may be reduced, and the ejection loads on the movable section of the nozzle may likewise be reduced.

By reducing the area encompassed by seal 38 it is possible to reduce $P_c$cq.$A_s$ to less than $F_b$, so that $P_cA_s$ < $F_b$, and zero or even negative ejection loads are supported by the movable section of the nozzle. The minimization of the ejection loads on the movable section of the nozzle reduces bearing friction an torque between the movable and fixed sections of the nozzle, and the supporting structure for supporting the location of the movable section of the nozzle may be minimized. Thus, the structure supporting the movable section of the nozzle need not have high strength requirements as heretofore required. For example, the strength requirements are reduced and the force applied by the actuators 148 to move the movable section of the nozzle is minimized.

The present invention thus provides an omnivector nozzle capable of being selectively positioned, which nozzle prevents loads from being supported by the main gas seal. Furthermore, it is possible with a nozzle according to the present invention to reduce the ejection loads to a zero or negative value so that the strength requirements of supporting structure for positioning the movable section of the nozzle can be minimized, thereby reducing the weight of the nozzle.

This invention is not to be limited by the embodiment shown in the drawings and described in the description, which is given by way of example and not of limitation, but only in accordance with the scope of the appended claims.

We claim:

1. A nozzle assembly comprising: a fixed section having a substantially semispherical socket surface; a movable section forming a throat and an exit opening and having a substantially semispherical ball surface, said ball surface being in close relationship to said socket surface; seal means providing a fluid seal between said ball and socket surfaces; a substantially semispherical tongue depending from one of said sections; and a substantially semispherical recess in the other of said sections, said tongue having a bearing surface engaging a bearing surface on said recess, the bearing surfaces together supporting the main load between the fixed and movable sections of the nozzle, said movable section defining an axis of the nozzle, and the centers of rotation of said substantially semispherical socket surface, said substantially semispherical ball surface, said substantially semispherical tongue and said substantially semispherical recess all being disposed on said axis.

2. A nozzle according to claim 1 further including actuator means connected to said movable section for selectively adjusting the position of said movable section with respect to said fixed section.

3. A nozzle according to claim 2 wherein said fixed section is mounted to a rocket engine and said throat is in fluid communication with a combustion chamber of said rocket engine.

4. A nozzle according to claim 3 wherein said throat defines a center plane substantially perpendicular to said axis, said seal means being disposed on the center plane defined by said throat and $P_c \cdot A_s$ $F_b$, where $P_c$ is the pressure in said combustion chamber when said rocket engine is in operation, $A_s$ is the area encompassed by said seal means less the area of said throat, and $F_b$ is the force of the back pressure of exhaust gases on the movable section of the nozzle when said rocket engine is in operation.

5. A nozzle according to claim 1 wherein the load on the movable section is 0.

6. A nozzle according to claim 1 wherein said tongue depends from said movable section and said recess is in said fixed section.

7. In combination: a rocket engine having a first axis and a combustion chamber in which propellant is to be burned; and the nozzle having a second axis and a throat in fluid communication with said combustion chamber and an exit opening through which combustion gases are to be exhausted, said exit opening having a larger area than said throat, said nozzle comprising a fixed section having a substantially semispherical socket surface, said fixed section being mounted to said rocket engine, a movable section forming said throat and exit opening and having a substantially semispherical ball surface, said ball surface being engaged to said socket surface, seal means providing a fluid seal between said ball and socket surfaces, a substantially semispherical tongue depending from one of said sections, and a substantially semispherical recess in the other of said sections, said tongue having a bearing surface engaging a bearing surface on said recess, the bearing surfaces together supporting the main load between the fixed and movable sections of the nozzle, the centers of rotation of said substantially semispherical ball surface, said substantially semispherical socket surface, said substantially semispherical tongue, and said substantially semispherical recess all being disposed on second axis.

8. Apparatus according to claim 7 further including actuator means connected to said movable section for selectively adjusting the position of said movable section with respect to said fixed section to alter the angle between said second axis and said first axis.

9. Apparatus according to claim 7 wherein said throat defines a center plane substantially perpendicular to said second axis, said seal means being disposed on said center plane defined by said throat and $P_c \cdot A_s$ $F_b$, where $P_c$ is the pressure in said combustion chamber when said rocket engine is in operation, $A_s$ is the area encompassed by said seal means less the area of said throat, and $F_b$ is the force of the back pressure of exhaust gases on the movable section of the nozzle when said rocket engine is in operation.

10. Apparatus according to claim 7 wherein the load on the movable section is 0.

11. Apparatus according to claim 7 wherein said tongue depends from said movable section and said recess is in said fixed section.

12. A nozzle according to claim 1 wherein said movable section defines an axis of the nozzle and said throat defines a center plane substantially perpendicular to said axis, said seal means being disposed on the center plane defined by said throat and $P_c \cdot A_s$ $F_b$, where $P_c$ is the pressure in said combustion chamber when said rocket engine is in operation, $A_s$ is the area encompassed by said seal means less the area of said throat, and $F_b$ is the force of the back pressure of exhaust gases on the movable section of the nozzle when said rocket engine is in operation.